(12) United States Patent
Van den Bergh

(10) Patent No.: US 11,384,030 B2
(45) Date of Patent: Jul. 12, 2022

(54) FIBER CEMENT PRODUCT COMPRISING AT LEAST ONE PROFILED SURFACE

(71) Applicant: ETEX SERVICES NV, Kapelle-op-den-Bos (BE)

(72) Inventor: Frank Van den Bergh, Kapelle-op-den-Bos (BE)

(73) Assignee: Etex Services NV, Kapelle-op-den-Bos (BE)

( * ) Notice: Subject to any disclaimer, the term of this patent is extended or adjusted under 35 U.S.C. 154(b) by 0 days.

(21) Appl. No.: 16/435,707

(22) Filed: Jun. 10, 2019

(65) Prior Publication Data

US 2019/0292109 A1 Sep. 26, 2019

Related U.S. Application Data

(63) Continuation of application No. 15/021,327, filed as application No. PCT/EP2014/069086 on Sep. 8, 2014.

(30) Foreign Application Priority Data

Sep. 13, 2013 (EP) .................................... 13184402

(51) Int. Cl.
| | |
|---|---|
| C04B 41/00 | (2006.01) |
| C04B 41/45 | (2006.01) |
| C04B 41/49 | (2006.01) |
| C04B 41/64 | (2006.01) |
| C04B 111/27 | (2006.01) |

(52) U.S. Cl.
CPC ........ *C04B 41/4922* (2013.01); *C04B 41/009* (2013.01); *C04B 41/4535* (2013.01); *C04B 41/4543* (2013.01); *C04B 41/4916* (2013.01); *C04B 41/64* (2013.01); *C04B 2111/27* (2013.01)

(58) Field of Classification Search
CPC combination set(s) only.
See application file for complete search history.

(56) References Cited

U.S. PATENT DOCUMENTS 3,401,493 A 9/1968 Lindner
5,798,429 A * 8/1998 Hager .................... C04B 41/009
427/387

(Continued)

FOREIGN PATENT DOCUMENTS

| EP | 1101787 A2 | 5/2001 |
|---|---|---|
| EP | 2036871 A1 | 3/2009 |

(Continued)

OTHER PUBLICATIONS

SILRES® BS Brochure, published by Wacker Chemie AG.
(Continued)

*Primary Examiner* — Alexander M Weddle
(74) *Attorney, Agent, or Firm* — Dilworth & Barrese, LLP

(57) ABSTRACT

A method for improving the hydrophobic properties of a fiber cement product, said method comprising the steps of: providing a fiber cement product comprising at least one profiled surface; applying a hydrophobation agent to the at least one profiled surface; wherein the obtained fiber cement product has a water take up of less than 1.5 mL after 48 hours as measured by the RILEM Test No 11.4 in horizontal application.

20 Claims, 2 Drawing Sheets

(56) References Cited

U.S. PATENT DOCUMENTS

| | | | |
|---|---|---|---|
| 6,000,194 A * | 12/1999 | Nakamura | B28B 19/003 52/783.17 |
| 6,346,146 B1 * | 2/2002 | Duselis | C04B 28/02 106/713 |
| 6,539,643 B1 * | 4/2003 | Gleeson | E04C 2/043 33/563 |
| 2003/0126817 A1 * | 7/2003 | Gleeson | C09J 133/20 52/460 |
| 2003/0203117 A1 | 10/2003 | Bartkowiak et al. | |
| 2004/0211340 A1 | 10/2004 | Trevethick | |
| 2005/0072056 A1 | 4/2005 | Famy et al. | |
| 2006/0024480 A1 | 2/2006 | Lyons et al. | |
| 2008/0131594 A1 * | 6/2008 | Cho | C04B 41/009 427/140 |
| 2008/0141908 A1 * | 6/2008 | Peng | C04B 20/1029 106/713 |
| 2009/0035587 A1 | 2/2009 | Killilea et al. | |
| 2009/0162602 A1 | 6/2009 | Cottier et al. | |
| 2009/0198000 A1 | 8/2009 | Weinelt et al. | |
| 2010/0136269 A1 * | 6/2010 | Andersen | B28B 3/26 428/34.4 |

FOREIGN PATENT DOCUMENTS

| | | |
|---|---|---|
| WO | 9845222 A1 | 10/1998 |
| WO | 9928275 A1 | 6/1999 |
| WO | 0165021 A1 | 9/2001 |
| WO | 02081399 A1 | 10/2002 |
| WO | 0345688 A1 | 6/2003 |
| WO | 2006086842 A1 | 8/2006 |

OTHER PUBLICATIONS

Technical Data Sheet for SILRES® BS 1702.
Installation Guide for HardieGroove™ lining (Jan. 2012).
Adrian Gerard Saldanha and Doris E. Eichburg Published Aug. 2013 (The Construction Specifier).
Dr David Stitt (Nov. 1997) published by the Oil and Colour Chemists' Association, Australia. Nov. 1997.
A. Gerdes and F.H.Wttmann , published by Aedificatio Publishers (2001).
Wacker Chemicals Australia Pty Ltd, published in Mar. 1995 (Wacker).
A. Thomas (1993), Chapter 13, Silicone Resins, 98-221, vol. 1, Surface Coatings, Raw Materials and their usage.
Historical pages of the website www.architecturalproducts.com (plycem website) captured from Oct. 2001 and Feb. and Apr. 2002.
Technical data sheet 6403 (issued on Jul. 7, 2011).
Description of RILEM test 11.4 as published in Materiaux et Constructions, May 1980, vol. 13, Issue 3, N 75, pp. 201-205.

* cited by examiner

FIBER CEMENT PRODUCT COMPRISING AT LEAST ONE PROFILED SURFACE

FIELD OF THE INVENTION

The present invention relates to fiber cement products, having improved hydrophobic properties and to methods to improve the hydrophobic properties of such fiber cement products.

BACKGROUND OF THE INVENTION

Fiber cement products are well known. However under some weather conditions, typically under humid conditions, water can penetrate into the fiber cement matrix of the product. In general, fiber cement products need to be protected to penetrating water, as the water may negatively influence the mechanical properties, resistance to weather conditions such as frost, the aging of the product and in some cases the appearance of the fiber cement product.

As an example, by slowly dissolving salts present in the matrix, the water can function as a carrier to bring the salts to the surface. This effect, called efflorescence, causes white traces to become visible on the surface.

To avoid these negative effects, agents which cause the fiber cement product to be more hydrophobic, hydrophobation agents, are used and applied to the surface of the fiber cement product. As such, water is to a large extent prevented to penetrate into the fiber cement matrix, reducing the efflorescence to a large extent.

However it was noticed that, when applying typical hydrophobation agents to a profiled, such as milled, surface, the hydrophobation agent itself leaves traces in the surface after being applied and dried.

SUMMARY OF THE INVENTION

It is an object of the present invention to provide a fiber cement product having at least one profiled, typically milled, surface, to which a hydrophobation agent is applied without leaving traces of this hydrophobation agent.

According to the first aspect of the present invention, a method for improving the hydrophobic properties of a fiber cement product is provided. The method comprises the steps of
  Providing a fiber cement product comprising at least one profiled surface;
  Applying a water-free silane-based liquid to the at least one profiled surface;
  Allowing said a water-free silane-based liquid to penetrate into the fiber cement product.

The water-free silane-based liquid is allowed to penetrate in to the pores of the fiber cement matrix along the outer profiled surface of the fiber cement product.

The term liquid refers to a liquid state under ambient temperature (21° C.) and at ambient pressure (1035 hPa). Matter is a liquid under these conditions when its volume remains constant while its shape adopts to the container in which it is provided.

According to some embodiments of the present invention, the water-free silane-based liquid may be a solvent-free silane-based liquid.

When a silane- and/or siloxane-base, water diluted liquid is used, it was found that white residue traces were noticed on the profiled surface of the fiber cement product. Using solvent diluted silane- and/or siloxane-based liquids to provide improved hydrophobic properties to the fiber cement product, often, but not always, discolored spots are visible. Both visual effects are noticed as defects, causing the fiber cement product to be either rejected or considered as impaired. The water-free and preferably solvent-free silane-based liquid comprises one or more silanes ($SiR_4$, each of the 4 R-groups independently being an organic group), and may further comprise on or more oligomer siloxanes ($H(R_2SiO)_nOH$, each of the R-groups independently being an organic groups). According to preferred embodiments, the water-free and preferably solvent-free silane-based liquid may comprise or even may consist of alkyltriethoxysilane.

More preferred, the used water-free, and preferably also solvent-free silane-based liquid comprises at least 50% w, even more than 75% w of silanes. Most preferred, the water- and solvent-free silane-based liquid comprises 99% w or more of silanes.

The water-free and preferably also solvent-free silane-based liquid provides the treated surface with improved hydrophobic properties. The water-free and preferably also solvent-free silane-based liquid is used as a so-called hydrophobation agent.

It was found that other hydrophobation agents were not suitable for use on profiled fiber cement products, in particularly not on surfaces where recesses and/or groves are milled. The other hydrophobation agents were not able to penetrate in the fiber cement material along the inside corners of the recessions, leaving traces of polymerized hydrophobation agent.

Though the reason is not fully understood, water-free and preferably also solvent-free silane-based liquid, when used as hydrophobation agent on profiled fiber cement products, in particularly having recesses or groves along its surface, was found to penetrate in the fiber cement material also along the inside corners of the recessions, without leaving visual traces.

The fiber cement products obtainable by the method according to the first aspect of the present invention may have an average density in the range of 0.35 $kg/m^3$ to 2 $kg/m^3$, such as between 0.4 $kg/m^3$ and 1.9 $kg/m^3$. The average density is the density at average over a representative surface and thickness. The product at its profiled surface may have a density slightly higher as the density throughout the product at the non profiled volumes and surfaces. This due e.g. the profiling action, such as milling and alike.

The benefit of the use of water-free and preferably also solvent-free silane-based liquid is best noticeable for fiber cement products having higher density. The fiber cement products obtainable or obtained using a method according to the invention preferably have a density in the range of 0.9 $kg/m^3$ to 2 $kg/m^3$, such as in the range of 1.1 $kg/m^3$ to 1.95 $kg/m^3$, more preferred in the range of 1.15 $kg/m^3$ to 1.9 $m/kg^3$.

The fiber cement products have a hydrophobic property expressed as the fiber cement product having a water take up of less than 1.5 ml after 48 h using the RILEM Test No 11.4 in horizontal application. Preferably the water take up is even less than 1 ml per 48 h according to this test.

This is obtained using water-free and preferably also solvent-free silane-based liquid as hydrophobation agent. When the water-free and preferably also solvent-free silane-based liquid also comprised siloxanes, a significant improvement of the beading effect can be obtained.

According to some embodiments of the present invention, the water-free silane-based liquid may be applied to the at least one profiled surface in an amount of less than 150 $g/m^2$, and more than 10 $g/m^2$.

More preferred less than 120 g/m² or even less than 90 g/m² is applied to the profiled surface. More preferred more than 40 g/m² or even more than 50 g/m² or even more than 60 g/m² is applied to the profiled surface.

It is understood that also the other sides and surfaces of the fiber cement product, in particular when the product is a fiber cement plate, can be treated with the same or a different hydrophobation agent.

The fiber cement product can be any type of product, but typically is a product having a planar shape.

According to some embodiments of the present invention, the fiber cement product may be a fiber cement plate.

Fiber cement plates are well known in the art. The fiber cement products are made out of fiber cement slurry, which is formed in a so-called green fiber cement product, and cured.

Dependent to some extent on the curing process used, the fiber cement slurry typically comprises water, process or reinforcing fibers which both may be natural organic fibers (typically cellulose fibers) or synthetic organic fibers (polyvynilalcohol, polyacrilonitrile, polypropylene, polyamide, polyester, polycarbonate, polyethylene, etc.), cement e.g. Portland cement, limestone, chalk, quick lime, slaked or hydrated lime, ground sand, silica sand flour, quartz flour, amorphous silica, condensed silica fume, microsilica, met-alkaolin, wollastonite, mica, perlite, vermiculite, aluminum hydroxide, pigments, anti-foaming agents, flocculants, and other additives.

The green fiber cement product is cured, typically by curing to the air (air cured fiber cement products) or under pressure in presence of steam and increased temperature (autoclave cured). For autoclave cured products, typically sand is added in the fiber cement slurry. The autoclave curing typically results in the presence of 11.3 Å (angstrom) Tobermorite in the fiber cement product.

Fiber cement plates usually are made using the well known Hatschek-process, flow-on process or Magnani-process.

According to embodiments, the fiber cement plate may have at least one flat, non profiled surface. This least one flat, non profiled surface may be present opposite to the profiled surface of the fiber cement product.

The fiber cement plate may preferably have a thickness up to 45 mm. The fiber cement plate according to the invention may have a thickness up to and including 35 mm, optionally only up to and including 30 mm, or even only up to and including 25 mm, a height typically up to 4 m and a width typically up to 1.5 m. Most preferred the thickness of the plate are in the range of 4 mm to 40 mm, such as in the range of 5 mm to 35 mm, e.g. in the range of 5 mm to 20 mm, more preferred in the range of 5 mm to 16 mm, e.g. 5 mm, 6 mm, 7 mm, 8 mm, 9 mm, 10 mm, 11 mm, 12 mm, 13 mm, 14 mm or 15 mm. The height of the fiber cement plate may preferably be in the range of 1.5 m to 4 m, most preferred in the range of 2 m to 4 m, e.g. in the range of 2.5 m to 3.7 m, e.g. 2.5 m, 2.6 m, 2.7 m, 2.8 m, 2.9 m, 3.0 m, 3.1 m, 3.2 m, 3.3 m, 3.4 m, 3.5 m, 3.6 m and 3.7 m. The width of the fiber cement plate may preferably be in the range of 0.6 m to 1.75 m, most preferred in the range of 0.6 m to 1.5 m, e.g. in the range of 0.75 m to 1.5 m, e.g. 1.0 m, 1.1 m, 1.2 m, 1.3 m, 1.4 m or 1.5 m.

Preferably the fiber cement product is a fiber cement plate, having two substantially flat surfaces, of which one or two, preferably only one, is provided with a profile. The profile may be a random or random-like profile. An example of such profile may be the profile of timber.

Alternatively the profile is a repetitive profile, such as a checkerboard profile with locally sunk rectangular or square surfaces.

The profile may comprise sunk parts or surfaces, delimited by flanks having an angle between the sunk surface and the flank in the range of 90° to about 180°, preferably more than 90°, such as more than 95° or more than 100°, and less than 175° such less than 170° or less than 165° such as less than 160° even less than 155° or less than 150°. The inner, as well as potentially outer corners may have a sharp delimitation, or may be rounded, typically with a small bending radius.

According to some embodiments of the present invention, the fiber cement product may be a fiber cement plate having at least one surface comprising at least one groove. According to some embodiments of the present invention, the profiled surface comprises a plurality of grooves being equally distributed over the surface, the grooves all have a uniform direction and a uniform depth.

The grooves may have a cross section in a section according to a plane perpendicular to the direction of the groove being triangular, trapezoid, rectangular or square, elliptic, circular, or alike.

According to some embodiments of the present invention, the grooves may have a trapezoid cross section in a section according to a plane perpendicular to the direction of the groove, the groove having a flat bottom and two flanks, the angles between the bottom and each of the flanks is in the range of 90° to about 180°, preferably more than 90°, such as more than 95° or more than 100°, and less than 175° such less than 170° or less than 165° such as less than 160° even less than 155° or less than 150°.

The depth of the grooves is preferably more than 0.1 mm, and more preferred in the range of 0.15 mm to 1.0 mm, such as between 0.15 mm and to 0.5 mm. The maximum width at the bottom of the groove is preferably in the range of 2 mm to 20 mm, and most preferred in the range of 4 mm to 15 mm.

As an example, the grooves may have a trapezoid cross section and distributed at equal distances one to the other. As such the profile of a section according to a plane perpendicular to the direction of the groove will have a step-wave shape.

The width of the top surfaces between adjacent grooves is preferably more than 1 mm, typically more than 2 mm or more than 3 mm.

According to some embodiments of the present invention, the water-free silane-based liquid may penetrate at least 1 mm into the profiled surface.

According to some embodiments of the present invention, the fiber cement product may be an autoclave cured fiber cement product. Alternatively the fiber cement product may be an air cured fiber cement product.

According to some embodiments of the present invention, the fiber cement product may be obtained using a Hatschek process. According to some embodiments of the present invention, the fiber cement product may be obtained using a flow-on process. According to some embodiments of the present invention, the fiber cement product may be obtained using a Magnani-process.

According to some embodiments of the present invention, applying the water-free silane-based liquid may be done by spraying the water-free silane-based liquid to the profiled surface.

Such spraying may be done by means of any known spraying installation. Given the profiled surface to be sprayed, the spraying nozzles may have angled positions in view of the surface to be sprayed to guarantee an equal amount of liquid to be sprayed over the profiled surface. Optionally the spraying nozzles may have a dynamically changeable orientation.

According to some embodiments of the present invention, applying the water-free silane-based liquid may be done by brushing or rolling the water-free silane-based liquid to the profiled surface.

The brushes and/or rollers preferably needs to be sufficiently soft, flexible and/or compressible to allow them to contact the profiled surface also in the lower sunken parts.

According to some embodiments of the present invention, the provision of a fiber cement product comprising at least one profiled surface may comprise the provision of a green fiber cement plate using a Hatscheck process, and profiling at least one surface of the fiber cement plate after curing of the green fiber cement plate.

A green fiber cement product is to be understood as the product obtained directly after shaping the product, but before the cement is cured.

The green fiber cement product may be pressed before curing.

According to some embodiments of the present invention, the green fiber cement plate may be cured using autoclave curing.

According to some embodiments of the present invention, the profiled surface may be provided by milling the fiber cement product.

The fiber cement product according to the invention has at least one, and possibly more than one surface which is profiled, typically milled or grinded.

The fiber cement product comprising at least one profiled surface which is preferably provided after curing the cement of the fiber cement product. Such profiled surface is to be understood as a post-curing profiled surface.

The profiled surface may be provided by profiling a surface of the green fiber cement product, by pressing a profile in to the surface of the green fiber cement product. It may even be profiled during production of the green fiber cement product, e.g. by using equipment with profiled surfaces which contacts the fiber cement slurry during the provision of the green fiber cement product.

Most preferably the profiled surface is provided after curing of the green fiber cement product. This is typically done by milling.

The milling can be done using suitable milling tools such as milling cutters, typically having hard metal of diamond coated cutting surfaces.

According to a second aspect of the present invention, a fiber cement product obtained according to the first aspect of the present invention is provided.

According to a second aspect of the present invention, a fiber cement product is provided, which comprising at least one profiled surface, the fiber cement product comprises a porous fiber cement matrix along the at least one profiled surface characterized in that water-free silane-based hydrophobic agent, originating from a water-free silane-based liquid, is present in the pores of the matrix along the at least one profiled surface.

According to some embodiments of the present invention, the profiled surface may be free of silane- and siloxane-residue.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1A:
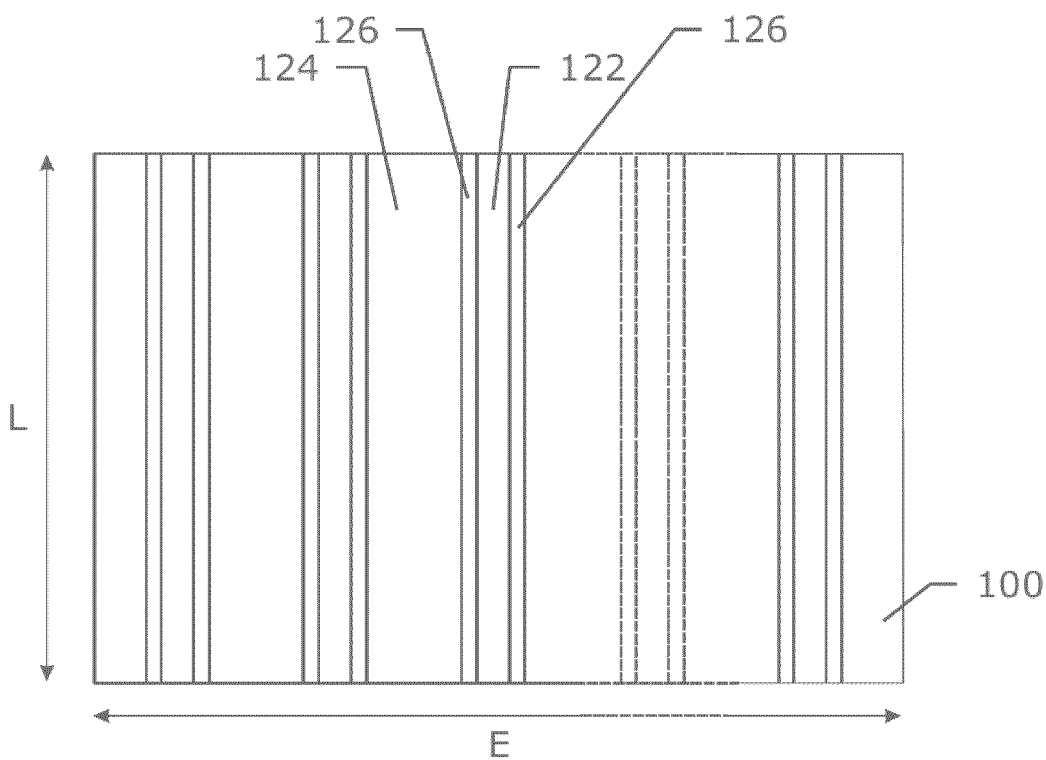
FIG. 1a is schematically a top-view of a profiled fiber cement product, having one post-curing profiled surface, according to the invention.

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics may be combined in any suitable manner in one or more embodiments, as would be apparent to one of ordinary skill in the art.

When reference is made to a range, unless otherwise specified, the range is to be understood inclusive.

The fiber cement product, being a fiber cement plate 100 in FIG. 1, comprises one profiled surface 102, provided by milling of the trapezoid like grooves 110 after the fiber cement plate 100 was cured in an autoclave. The cured fiber cement product before milling is obtainable from Eternit NV as EQUITONE [Tectiva].

After having been milled using appropriate milling tools, the profiled surface 102 is provided with an hydrophobation agent being water-free silane-based liquids. The used liquids are set out in table 1. Hydrophobation agents used in test 4 to 9 are water-free silane-based liquids, i.e. according to a method of the present invention. Hydrophobation agents in test 4, 6, 7 and 8 are also solvent-free.

In each case, this product is applied by spraying the liquid to the profiled surface. The profiled surface has a width E of 1.22 m and a height L of 2.5 m, resulting in a surface of 3.05 $m^2$. The amount of liquid, per such surface unit of the profiled surface was 80 $g/m^2$.

TABLE 1

| test # | Product name | Water/solvent born | Active ingredient(s) | W % active ingredient in liquid applied |
|---|---|---|---|---|
| 1 | DC520[1] | Water born | Silane & siloxane | 16 |
| 2 | DC520 + IE6682[1] | Water born | Silane & siloxane | 16 |
| 3 | IE6682[1] | Water born | silane | 16 |
| 4 | Z6341[1] | Waterfree & solventfree | silane | 100 |
| 5 | Funcosil SNL[2] | Solvent born | Silane & siloxane | 7 |
| 6 | Protectosil BHN[3] | Waterfree & solventfree | silane | 100 |
| 7 | Protectosil BHN[3] | Waterfree & solventfree | silane | 100 |
| 8 | Protectosil 100NK[3] | Waterfree & solventfree | silane | 100 |
| 9 | Z6689/MR2404[1] | Solvent born | silane | 7.5 |

[1]available from Dow Corning;
[2]available from Remmers
[3]available from Demula/Evonik After having allowed the liquid to penetrate into the profiled surface, the liquid has penetrated into the surface up to an average depth D, as such providing a zone 120 in which the hydrophobation agent is present in the porous fiber cement matrix.

The profiled surfaces are tested on hydrophobicity using the RILEM Test No 11.4 in horizontal application. Also the presence of white residue of the hydrophobation agent was noted (yes or no), and the beading effect of the hydrophobation agent was characterized using a ranking of 1 (water droplets are either soaked up by the surface or remain present as droplets with contact angle of 90° or less between surface and droplet) to 5 (droplets remain on surface as beads, the contact angle being substantially 180°). The results are set out in table 2.

The contact angle between a surface Sx and the outer surface of a droplet is the angle between the tangent, at the contact point between surface Sx and the droplet surface, of the curve obtained by making a section of the outer surface of the droplet and a plane perpendicular to the surface Sx, the angle being the angle oriented towards the droplet volume.

TABLE 2

| | results | | |
|---|---|---|---|
| test # | Rilem test after 48 h (ml) | White residue present? (y/n) | Beading; visual assessment (1 to 5) |
| 1 | 0.3 | Y | 4 |
| 2 | 0.4 | Y | 3 |
| 3 | 0.45 | Y | 2 |
| 4 | 0.23 | N | 4 |
| 5 | 0.35 | N | 4 |
| 6 | 0.28 | N | 3 |
| 7 | 0.28 | N | 2 |
| 8 | 0.3 | N | 5 |
| 9 | 0.4 | N | 5 |

As is noticeable, the tests 4 to 9, using a water-free, silane based hydrophobation agent, no white residue of the hydrophobation agent is left.

Figure 1B:
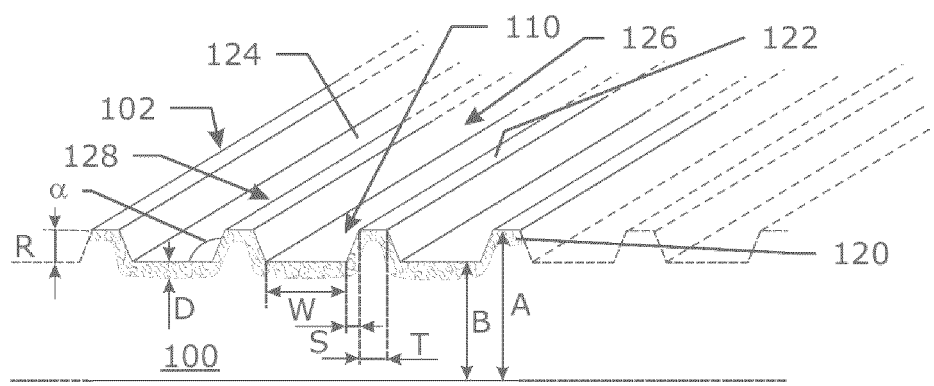
FIG. 1b is schematically a side-view of a part of this profiled fiber cement product of FIG. 1a, having one post-curing profiled surface, according to the invention.

As can be seen in FIGS. 1a and 1b, the profile is a step-wave profile 122 having trapezoid like grooves 110 with a recess depth R of 2 mm, a top width T of 8 mm and a recess width W of 12 mm. The total thickness A of the plate 100 is 10 mm, and a remaining thickness B at the lower surface or bottom 124 of the groove of 8 mm. The inclination angle α between the bottom 124 and each of the flanks 126 and 128 is 110°, thus providing slopes with a slope width S.

Figure 2:
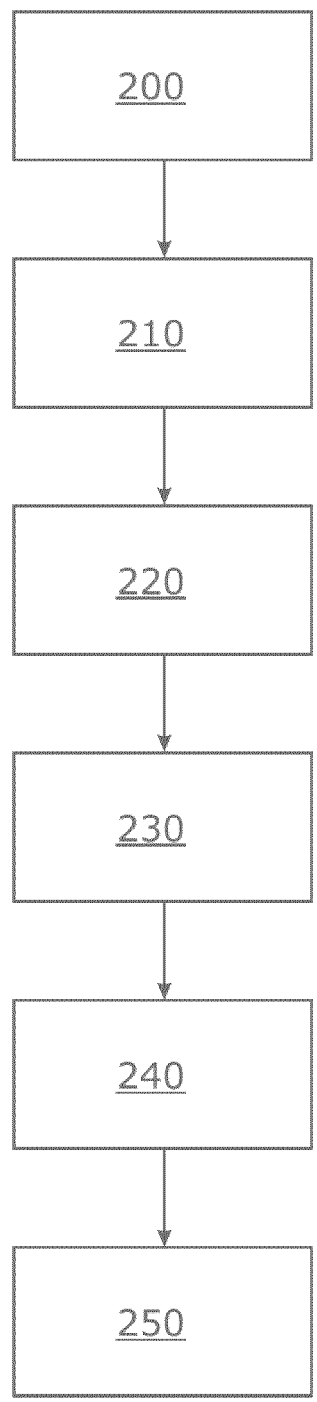
FIG. 2 is a schematically view of a process to improve the hydrophobic properties of a profiled fiber cement product, having one post-curing profiled surface, according to the invention The same reference signs refer to the same, similar or analogous elements in the different figures.

A schematic view of the method to provide the fiber cement products according to the invention is shown in FIG. 2.

The method for improving the hydrophobic properties of a fiber cement product, comprises first the step 200 of providing a green fiber cement product, preferably a plate. This may be done by a Hatscheck process.

This green plate may optionally be compresses in the optional step 210, after which the green fiber cement plate is cured by means of air curing or autoclave curing in step 220.

In a next step 230, the cured product is given a profiled surface by e.g. milling. Thereafter in a next step 240 water-free, silane based hydrophobation agents are applied, e.g. by spraying to the at least one profiled surface.

The applies hydrophobation agent is allowed to penetrate in step 250 and a product according to the present invention is obtained. The hydrophobation agent is penetrated through the surface into the pores of the fiber cement matrix of the fiber cement product. At the surface, no visual residue of the hydrophobation agent is left.

It is to be understood that although preferred embodiments and/or materials have been discussed for providing embodiments according to the present invention, various modifications or changes may be made without departing from the scope and spirit of this invention.

The invention claimed is:

1. A method for increasing hydrophobicity of a fiber cement product, said method comprising the steps of
   providing a fiber cement product comprising at least one profiled surface where grooves are milled, said grooves each having a depth in the range 0.15 mm to 1 mm and a maximum width at a bottom of the groove in the range 2 mm to 20 mm; and
   applying a hydrophobation agent to the at least one profiled surface
   to obtain fiber cement product having a water take up of less than 1.5 mL after 48 hours as measured by the RILEM Test No 11.4 in horizontal application,
   wherein the hydrophobation agent is water free and the combination of a silane-based liquid comprising at least one silane of the formula $SiR_4$ with each of the four R-groups independently being an organic group, three of the R-groups being selected from ethoxy or methoxy groups and the fourth R-group being a branched or linear hydrocarbon chain of an octyl, isobutyl or methyl group, and at least one oligomer siloxane of the formula $H(R_2SiO)_nOH$ with each of the R-groups independently being an organic group; and allowing said silane-based liquid to penetrate the at least one profiled surface without leaving visual traces.

2. A method according to claim 1, wherein the water take up is less than 1 mL per 48 hours.

3. A method according to claim 1, wherein the fiber cement product is a fiber cement plate.

4. A method according to claim 1, wherein the grooves are equally distributed over said surface, said grooves all have a uniform direction and a uniform depth.

5. A method according to claim 1, wherein each said groove has a trapezoid cross section in a section according to a plane perpendicular to the direction of the groove, said groove having a flat bottom and two flanks, the angles between the bottom and each of said flanks is in the range of 90° to about 180.

6. A method according to claim 1, comprising the step of autoclave curing the fiber cement product.

7. A method according to claim 1, comprising the step of air curing the fiber cement product.

8. A method according to claim 1, wherein the provision of a fiber cement product comprising at least one profiled surface comprises providing a green fiber cement plate using a Hatschek process, and profiling at least one surface of said fiber cement plate.

9. A method according to claim 8, wherein the green fiber cement plate is cured using autoclave curing.

10. A method according to claim 8, wherein the green fiber cement plate is cured using air curing.

11. A method according to claim 8, wherein the at least one profiled surface is provided by profiling a surface of the green fiber cement product.

12. A method according to claim 8, wherein the at least one profiled surface is a post-curing profiled surface.

13. A method according to claim 12, wherein the at least one profiled surface is provided by milling the fiber cement product.

14. A method according to claim 1, wherein the hydrophobation agent is applied to the at least one profiled surface by spraying.

15. A method according to claim 14, comprising the additional step of changing angular orientation of spray nozzles to ensure an amount of hydrophobation agent is uniformly sprayed over the at least one profiled surface and reaches corners thereof.

16. A method according to claim 1, wherein the silane-based liquid comprises at least 50% w of the at least one silane.

17. A method according to claim 1, wherein said grooves are milled to a depth 0.15 mm to 0.5 mm, and maximum width of 4 mm to 15 mm.

18. A method according to claim 1, wherein the hydrophobation agent is also solvent-free.

19. A fiber cement product obtained according to claim 1.

20. A fiber cement product according to claim 19, wherein the at least one profiled surface is free of silane- and siloxane-residue.

* * * * *